(12) United States Patent
Reiter et al.

(10) Patent No.: US 7,846,048 B2
(45) Date of Patent: Dec. 7, 2010

(54) MULTI-SPEED SPROCKET ASSEMBLY

(75) Inventors: Markus Reiter, Schweinfurt (DE); Frank Schmidt, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 116 days.

(21) Appl. No.: 11/683,377

(22) Filed: Mar. 7, 2007

(65) Prior Publication Data

US 2007/0213155 A1  Sep. 13, 2007

(30) Foreign Application Priority Data

Mar. 7, 2006  (DE) ................. 10 2006 010 498

(51) Int. Cl.
*F16H 55/12* (2006.01)

(52) U.S. Cl. .................... 474/160; 474/158

(58) Field of Classification Search .............. 474/160, 474/78, 152, 158, 164
See application file for complete search history.

(56) References Cited

U.S. PATENT DOCUMENTS

| | | | | |
|---|---|---|---|---|
| 5,073,151 A | * | 12/1991 | Nagano | 474/160 |
| 5,192,249 A | * | 3/1993 | Nagano | 474/160 |
| 5,437,582 A | | 8/1995 | Romano | |
| 5,514,042 A | * | 5/1996 | Liou | 474/160 |
| 5,545,096 A | * | 8/1996 | Su | 474/160 |
| 5,569,107 A | | 10/1996 | Mu | |
| 5,716,297 A | * | 2/1998 | Bodmer | 474/78 |
| 5,738,603 A | * | 4/1998 | Schmidt et al. | 474/158 |
| 5,876,159 A | * | 3/1999 | Tseng et al. | 409/51 |
| 6,045,472 A | | 4/2000 | Sung | |
| 6,102,821 A | * | 8/2000 | Nakamura | 474/160 |
| 6,139,456 A | * | 10/2000 | Lii et al. | 474/152 |
| 6,923,741 B2 | * | 8/2005 | Wei | 474/160 |

FOREIGN PATENT DOCUMENTS

| | | |
|---|---|---|
| DE | 39 36 921 A1 | 5/1990 |
| DE | 44 34 752 A1 | 4/1996 |
| EP | 0 313 345 B1 | 4/1989 |
| EP | 0 479 032 A1 | 4/1992 |
| EP | 0 642 972 B1 | 8/1998 |
| EP | 1 522 490 A2 | 4/2005 |
| EP | 1522490 A2 * | 4/2005 |

* cited by examiner

*Primary Examiner*—Robert A Siconolfi
*Assistant Examiner*—Stephen Bowes
(74) *Attorney, Agent, or Firm*—Milan Milosevic; Lisa Serdynski (57) ABSTRACT

A multi-speed sprocket assembly is suggested, including at least a larger sprocket and at least a smaller sprocket. The smaller sprocket has a trailing tooth which is last to engage the chain before moving onto the larger sprocket. The larger sprocket has a leading tooth which either is the first to engage between a first outer link plate pair of the chain or is located adjacent to a first inner link plate pair of the chain. At least the larger sprocket has an upshift transitional region which has a double spacewidth created by omitting a tooth and is immediately followed by the leading tooth. In the region of the double spacewidth, the larger sprocket is embodied in such a way that a crossing chain link comes into contact with the larger sprocket only in the region of the leading tooth.

14 Claims, 8 Drawing Sheets

MULTI-SPEED SPROCKET ASSEMBLY

BACKGROUND OF THE INVENTION

The invention relates to bicycle shifting systems, and more particularly, to a multi-speed sprocket assembly for a bicycle shifting system that ensures proper shifting from a smaller sprocket to a larger sprocket.

Derailleurs, in particular for bicycles, have existed for a long time. In spite of their open and therefore unprotected construction as compared, for example, to hub shifters, derailleurs are very popular due to their high level of efficiency, light weight, and cost-effective structure. In recent times, attempts have been made to improve shifting function, in particular for shifting under load as well as to reduce the gear step by correspondingly increasing the number of sprockets. For example, a ten-gear shifting system has been attempted with ten respective sprockets, with consecutive sprockets differing from one another by only one tooth.

In derailleurs, the most critical issue is shifting up from a smaller sprocket to a larger sprocket, under load if possible. In such cases, the provision of a special upshift transitional region in which favorable conditions exist for shifting has been known. No shifting occurs in the regions between the transitional regions because, in these regions, the chain is deflected from the larger gear wheel and remains on the smaller gear wheel.

In order to ensure an even and jolt-free shifting process in the transitional regions, the same gear wheels are offset from one another at an angle such that, taking into account the chain pitch, the chain assumes a desired course. However, it must be kept in mind here that the chain does not include identical chain links; rather, it includes alternating chain links with interior link plate pairs, the inner links, and chain links with outer link plate pairs, the outer links. Therefore, when a leading tooth of the larger sprocket cooperates for the first time with a chain link while the chain is being thrown, it often occurs that, if this leading chain link is an outer link, then the leading tooth engages between the outer link plates, but when the leading chain link is an inner chain link, then the leading tooth is located next to the inner pair of link plates. This situation must be taken into account when designing the derailleur. Here, it is important in both shifter configurations, among other things, to ensure that the teeth following the leading tooth opposite the running direction be securely engaged in the chain. Thus, the chain must be prevented from "riding" on the larger sprocket, in that a chain link lands on a tooth tip.

To ensure proper shifting, sufficient room must be provided for the oblique chain, which is normally achieved by providing corresponding recesses on the side of the larger sprocket facing smaller sprocket. Here, the base of the recess forms a contact surface for a chain link or a chain pin of the chain that is crossing from the smaller sprocket to the larger sprocket for the axial alignment of the chain (EP 0 313 345 B1).

A radial guide of a link pair may be provided in the transitional region, specifically with the aid of a link contact ramp on the side of the larger sprocket facing the smaller sprocket in an end region of a double spacewidth of the large sprocket (EP 0 642 972). Because an axial guide is present as well, there are good conditions per se for a flawless shifting function. However, it has been shown that, under certain conditions, the chain slides off of the ramp and is displaced in the direction of the small sprocket. This leads to an extension of the crossing chain section, which is comprised of two chain links, with the result of faulty shifting function.

The above solutions are sensitive to dirt because dirt between the radial or lateral guide surface and the link plate may lead to a malfunction. In general, it is also possible to use only one type of chain, which is adapted to the multi-speed sprocket assembly. Although the shifting chains produced by different manufacturers have the same basic dimensions (interval 12.7 mm, inner width 2.38 mm, and roller diameter 7.75 mm in accordance with ISO 082 for derailleurs), there are differences in the structure of the outer link plates, for example, due to an arcing of the outer link plates, as well as in the length of the link pins with a corresponding larger or smaller distance past the respective outer link plate.

DE 39 36 921 A1 discloses a multi-speed sprocket assembly with a tooth number difference of 1 between consecutive sprockets. In order to facilitate the crossing of the chain and thus obtain a radial guide, a tooth of the smaller sprocket is shaped in the transitional region to correspond with the contour of the crossing link plate, in order to be able to radially support, in places, the crossing link plate that is located farther from the sprocket.

SUMMARY OF THE INVENTION

The object of the invention is to provide a multi-speed sprocket assembly that ensures reliable shifting even in the case of small gradations between gear steps, is also suitable for shifting chains with different structures, and, moreover, is not sensitive to dirt.

The radial guide, which is important for proper shifting, is attained by adapting the one crossing chain joint between the rear tooth flank of the trailing tooth of the smaller sprocket and the front tooth flank of the leading tooth of the larger sprocket. The axial guide results from the engagement of the trailing tooth between the link plates of the trailing chain link preceding the crossing chain link in the travel direction of the chain. Here, an allowance is made based on the shifting configuration with the leading tooth on the interior of an outer link plate of the first link connection (referred to in the following as an "outer link plate configuration"), the crossing chain must be displaced to the smaller sprocket by the thickness of the leading tooth in order to arrive in the alternate configuration (referred to in the following as an "inner link plate configuration") with the leading tooth to be adjacent to the exterior of an inner link plate of the leading chain link. Because according to the invention only one chain link is provided between the leading tooth of the larger sprocket and the trailing tooth of the smaller sprocket, the trailing tooth in the outer link plate configuration is also located between two outer link plates of the trailing chain link such that, here, the chain may be displaced relatively far in the axial direction toward the large sprocket (maximally up to the stop on the inner side of the corresponding outer link plate). In the inner link plate configuration, on the other hand, the trailing tooth is located between two inner link plates with the axial play of the chain on the trailing tooth having been reduced by the thickness of one inner link plate. During the shifting process in the outer link plate configuration, the shifting chain, with engagement only on the trailing tooth, is therefore able to be displaced by the derailleur further toward the larger sprocket than in the inner link plate configuration such that, as the sprockets continue to rotate, the leading chain link arrives on the appropriate side of the leading tooth. This results in a guidance of the chain, and therefore a proper shifting operation, for both configurations.

The radial guidance as well as the axial guidance on the smaller sprocket are independent of the special structure of the manufactured form of the shifting chain, in particular with regard to the shape and thickness of the outer link plate as well as the length of the link pin. This results in a compatibility with chains from various manufacturers. The guide function is generally independent of any dirt, which collects between the sprockets because the double spacewidth according to the invention is so large that no contact occurs between the larger sprocket and crossing chain link, except during cooperation with the leading tooth.

It is preferable to provide for the larger sprocket to have a region that has been removed to form the double spacewidth with such a shape that the larger sprocket, viewed in the axial direction, does not overlap at all with the crossing chain link. For one, this results in a very cost-effective production because cutting out or stamping out is more cost-effective than, for example, punching processes. An advantageously low weight results as well.

Especially for small sprockets, such a large removed area may cause a considerable mechanical weakening of the sprocket. In the context of the invention, therefore, when the larger sprocket has a removed area forming the double spacewidth with such a shape, then the larger sprocket, viewed in the axial direction, has an overlap with the crossing chain link, albeit with a clearance between the crossing chain link and the larger sprocket in the region of the overlap.

In further embodiments of the invention, the larger sprocket has a recess, preferably a stamped recess, in an overlap region with the link plates of the trailing link plate pair to provide a clearance between the recess and the trailing link plate pair. In particular in the case of small sprockets, there may be space problems for the link plates of the trailing chain link that were cleared by the recess. Here as well, a clearance is provided between the recess and the trailing link plate pair in order to attain the advantages of the invention, namely compatibility with various models of shifting chains and insensitivity to dirt. According to the invention, an axial guide through the base of the recess is not necessary, because the axial guidance is ensured by the trailing tooth of the smaller sprocket engaging in the trailing plate pair.

In particular in the case of sprocket combinations with a difference of 1 between the nominal tooth numbers, it has been shown to be advantageous for the leading tooth in the region of a corner of a tooth tip formed on the radially outer end of the front tooth flank to cooperate with the link plate of the crossing chain link. However, the front link connection of the crossing chain link, i.e., its chain roller, is located directly across from the rear tooth flank of the trailing tooth such that, depending on the actual shifting situation and cable load as well as the current elongation of the shifting chain, a more or less pronounced contact may occur between the chain roller and the rear tooth flank. Contact may also occur if, at the end of the shifting process, the teeth of the larger sprocket following the leading tooth engage in the chain. However, after long use with a given chain length, it is also possible that no direct contact occurs between the chain roller and the rear tooth flank. However, this does not hinder the function of the sprocket assembly because the respective link plate (outer link plate or inner link plate) of the crossing chain link then comes into contact with the corner of the tooth tip of the leading tooth in a slightly higher position.

To further ensure proper shifting, the leading tooth may be offset from the course of the crossing chain link. Moreover, the thickness of the leading tooth may correspond to the thickness of an inner link plate of the shifting chain. As has been stated above, the thickness of the tooth corresponds to the lateral displacement path of the shifting chain on the leading tooth when both shifting configurations are compared to one another. The lateral displacement path of the shifting chain, which has been bent by the derailleur, across from the trailing tooth when changing from one configuration to the other configuration also corresponds to the thickness of the inner link plate, such that both displacement paths are substantially the same size.

In order to make even more certain that, during shifting, the leading chain link will arrive on the side of the leading tooth that is appropriate in the current shifting configuration without "riding" on it, it is possible to provide the leading tooth in the region of a corner of a tooth tip formed on the radially exterior end of the front tooth flank of the leading tooth with a positioning slope for an outer link plate of the leading chain link.

The use of the invention in a multi-speed sprocket assembly in which the nominal numbers of teeth on the larger and the smaller sprockets differ by 1 is particularly preferred. In this context, the term "nominal number of teeth" is understood to mean the number of teeth that the sprocket would have if none of the teeth had been removed to form a double spacewidth.

The invention also relates to a bicycle shifting system including a driving sprocket assembly and a driven sprocket assembly as well as a shifting chain connecting these two sprocket assemblies, with at least one of the sprocket assemblies being embodied as a multi-speed sprocket assembly as described above and with a derailleur being provided between the two sprocket assemblies in an intake area for displacing the chain, which transfers the chain for shifting gears from one of the two sprockets to the other sprocket.

These and other features and advantages of the present invention will be more fully understood from the following description of one or more embodiments of the invention, taken together with the accompanying drawings.

DETAILED DESCRIPTION

FIGS. 1-4 illustrate a multi-speed sprocket assembly 18 for a bicycle shifting system according to one embodiment of the present invention. Looking to FIG. 10, the bicycle shifting system 10 generally include a front sprocket assembly 12 driven by pedals 14, a rear sprocket assembly 18 connected to a wheel hub (not shown) and a bicycle chain 16 connecting the front and rear sprocket assemblies 12, 18.

Figure 10:
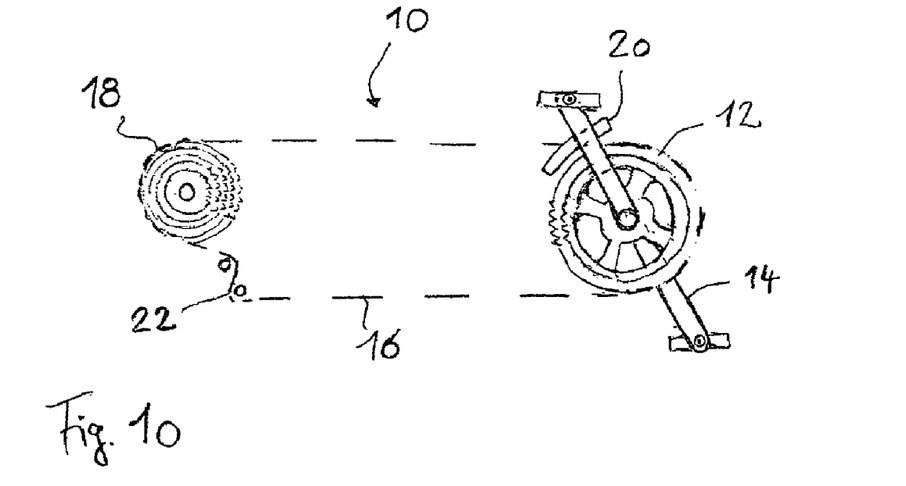
FIG. 10 is a side view of a bicycle shifting system.

In the example shown, the front sprocket assembly 12 includes two sprockets; it is also generally possible to provide three sprockets. A front derailleur 20 is used to displace the chain from one sprocket to the other. Correspondingly, a rear derailleur 22 is also arranged behind the rear sprocket assembly 18. Each of the two derailleurs 20 and 22 is provided in the intake area of the chain 16 such that it is possible to shift the chain between the sprockets in the desired manner.

As described below with reference to FIGS. 1 to 9, the invention has to do with an improved embodiment of multi-speed sprockets and, in principle, is therefore applicable to the driving sprocket assembly 12 as well as to the driven sprocket assembly 18, although it is preferred for the latter.

The principle structure of multi-speed sprocket assemblies (also referred to as cassettes) and their installation on corresponding axes is known. Therefore, the drawings are limited to the depiction of the sprockets (gear rims) and their cooperation with the shifting chain. For the purpose of explaining the shifting principle, the drawings are also limited to the depiction of two sprockets each, with the exception of FIG. 5 with four sprockets, which are, in turn, only part of a cassette that includes, for example, ten sprockets.

In FIGS. 1 to 4, two large sprockets are shown, a sprocket 24 with a nominal number of teeth of 16 as well as a sprocket 26 with a nominal number of teeth of 17. Because each of the two sprockets has an upshift trailing transitional region 24a and 26a, in which one tooth has been omitted in order for a double spacewidth to result, the sprocket 24 actually has only 15 teeth 28 and the sprocket 16 has only 26 teeth 30. Single spacewidths 32 are formed between consecutive teeth 28 and single spacewidths 34 are formed between consecutive teeth 30.

In particular, a trailing shifting tooth 28*l* of the smaller sprocket 24 is significant for the shifting process from the smaller sprocket 24 to the larger sprocket 26, and it is followed immediately in the direction opposite the chain travel direction L by the trailing transitional region 24a with the double spacewidth. Moreover, a leading tooth 30e of the larger sprocket 26 is also significant and it is followed immediately in the direction opposite the chain travel direction L by the leading transitional region 26a with the double spacewidth of the larger sprocket 26. The leading and trailing transitional regions 26a, 24a are aligned with each other.

Figure 3:
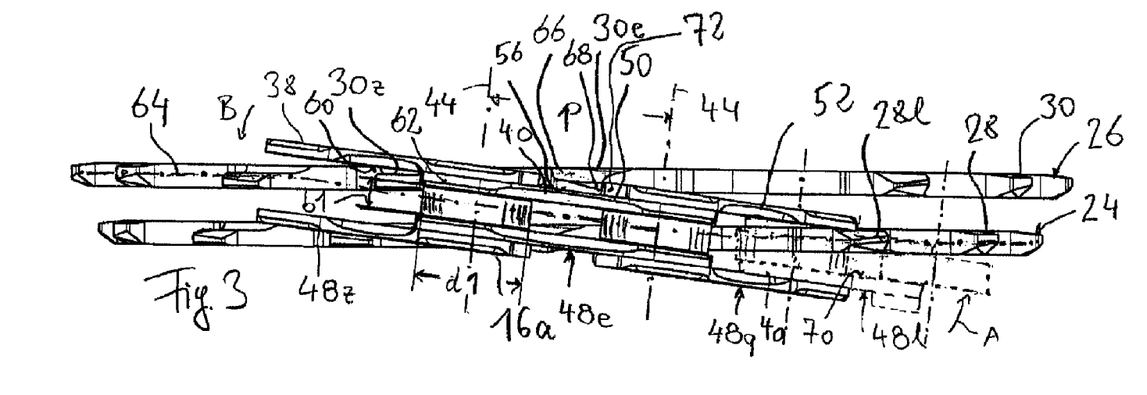
FIG. 3 is a view in the radial direction (Arrow III) of the arrangement shown in FIG. 1, but with a shortened chain segment.
Figure 4:
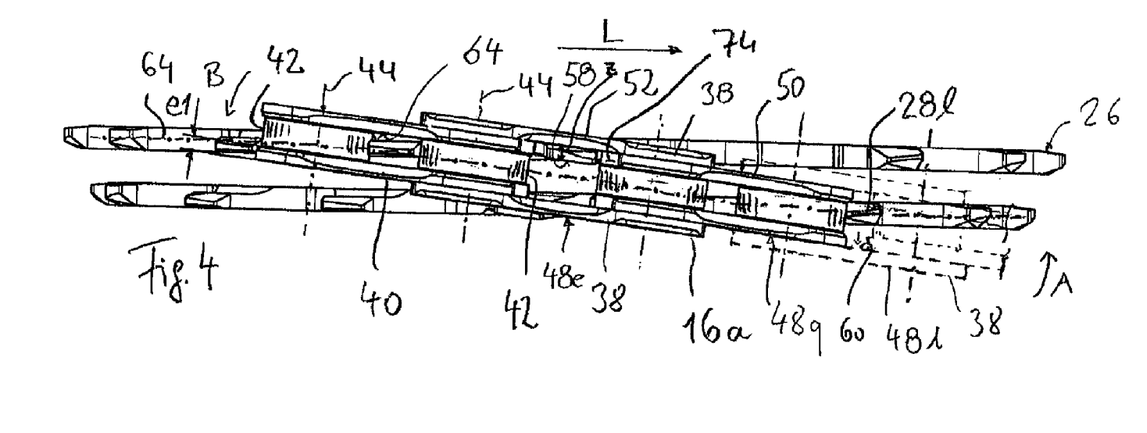
FIG. 4 is a view corresponding to FIG. 3, but with a configuration of FIG. 2 (arrow IV)

A section 16a of a shifting chain is resting on both sprockets 24 and 26; in order to simplify the illustration, the link connections 36 have been indicated only as circles and, in addition, are sectioned. However, the link connections 36 include a chain roller and a link pin, with an optional chain sheath between the chain roller and the link pin. The link connections 36 are connected to one another in an alternating fashion by outer link plates 38 and inner link plates 40. In FIGS. 3 and 4, chain rollers 42 as well as link connection axes 44 can be seen.

The shifting chain 16 is a conventional shifting chain for derailleurs whose basic dimensions are in compliance with norms (ISO No. 082). The chain pitch b is predetermined, i.e., the distance of 12.7 mm between consecutive link connection axes 44, the roller diameter dl of a maximum of 7.55 mm, and the inner width b1 (clearance between the inner link plates 40) with a minimum of 2.38 mm.

Otherwise, chain manufacturers have essentially free rein in structuring their shifting chains. Therefore, there are shifting chains in which the outer link plates are markedly arced outwards in a middle region. There are also derailleurs in which the link pins visibly protrude, in contrast to other chains in which the link pins essentially end flush with the outer link plates. As will be explained in greater detail below, the specific form of the chain is inconsequential to the orderly shifting function according to the invention, as long as the shifting chain complies with norms.

These chains may generally be divided into chain links 48, more precisely into inner links 50 composed of a pair of inner link plates 40 and sheaths as part of the corresponding chain joint as well as further into outer links 52 composed of a pair of outer link plates 38 and, connecting them, link pins protruding through the sheaths of the inner link plates 50. These link pins pass through the sheaths of the inner link plates and, along with the chain rollers 42, form the link connections 36.

At the transition from the sprocket 24 to the sprocket 26, there are specific chain links 48, which will play a role in the following, namely a trailing chain link 48*l* that, as the trailing chain link, still cooperates with a tooth, namely the trailing tooth 28*l* of the sprocket 24, which is followed in the direction opposite the chain travel direction L by a chain link 48q crossing to the larger sprocket 26. The next chain link is the leading chain link 48e, which is the first to cooperate with a tooth, namely the leading tooth 30e of the larger sprocket 26. Because the chain links 48 are not identical, but rather alternate between inner links 50 and outer links 52, there are also two possible configurations for shifting gears. In the inner link plate configurations shown in FIGS. 1 and 3, an inner link 50 cooperates with the leading tooth 30e of the larger sprocket 26 and an inner link 50 also cooperates with the trailing tooth 28*l* of the smaller sprocket 24. Conversely, in the outer link plate configuration according to FIGS. 2 and 4, an outer link 52 cooperates with the leading tooth 30e and an outer link 52 also cooperates with the trailing tooth 28*l*.

Figure 1:
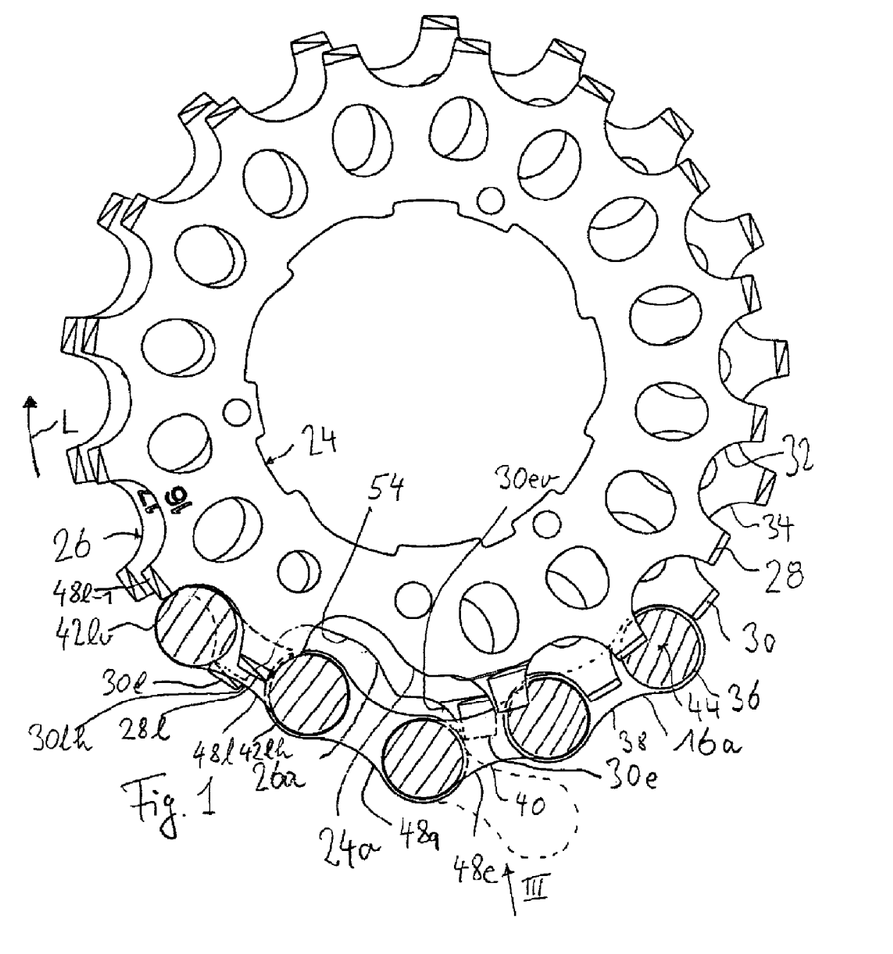
FIG. 1 is a side view of a multi-speed sprocket assembly according to one embodiment of the present invention engaged by a section of a chain.
Figure 2:
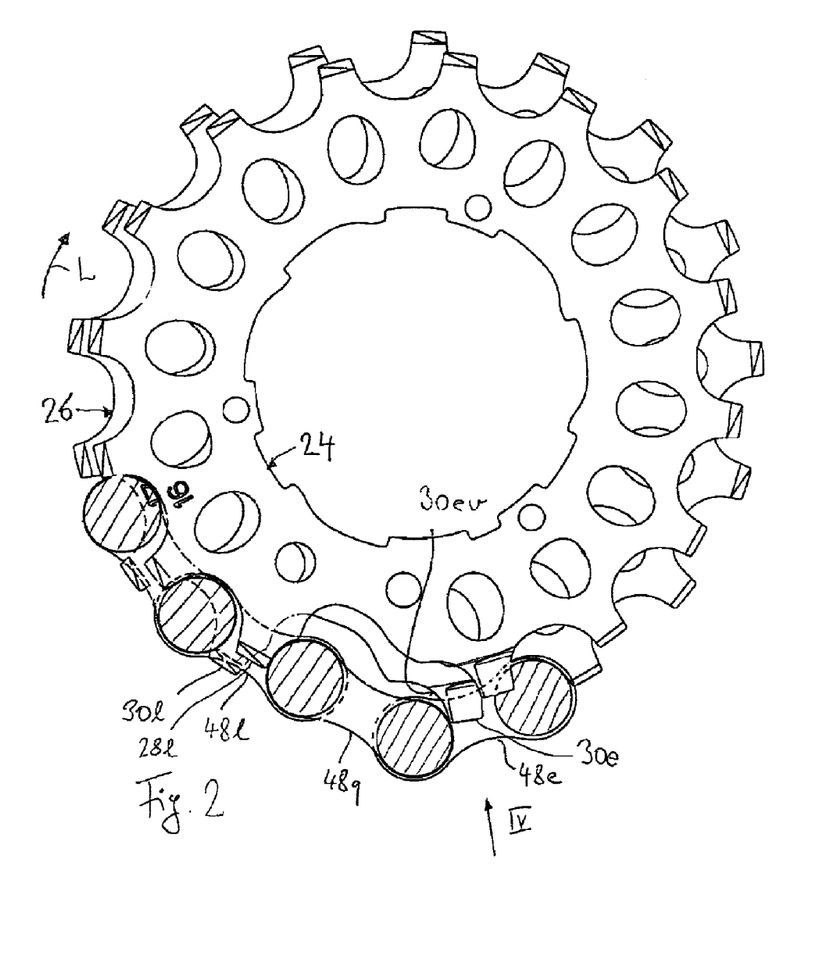
FIG. 2 is a side view of the multi-speed sprocket assembly of FIG. 1, but in an outer link plate configuration.

Looking to FIGS. 1 and 2, the leading transitional region 26a or leading transitional region forms a double spacewidth because the tooth of the larger sprocket 26 that would normally follow the leading tooth 30e at a distance p according to the chain pitch in the direction of rotation L is not present. The leading transitional region 26a is cut out so markedly inwards in the radial direction that there is not only no overlap between the outer contour of the crossing chain link 48q and the larger sprocket 26; in addition, as can be clearly seen from FIGS. 1 and 2, the outer contours of the crossing chain link 48q and the sprocket 26, viewed in the axial direction, are located at a considerable distance from one another, except in the region of contact with the leading tooth 30e. In detail, the leading transitional region 26a is formed by a contour line 54 of the sprocket 26 that originates from a rear tooth flank 30*lh* of the tooth 30*l* relative to the travel direction L of the chain and passes into a front chain tooth flank 30ev of the leading tooth 30e.

The leading transitional region 26a has been cut out or stamped out in a cost-effective manner. In this embodiment (in contrast to the embodiment according to FIGS. 8 and 9), the lateral surface of the larger sprocket 26 facing the smaller sprocket 24 is not structured, for example, by stamping or machining out a recess for accommodating and pitching the shifting chain. As a result, it may be produced in a particularly cost-effective manner. The considerable weight reduction of the sprocket is also advantageous. The normal path of the chain on the larger sprocket 26 (for example, after the completion of the upshift process described above) is also ensured in the trailing transitional region 24a in that, here, the chain link in question is able to be supported with its front and rear chain roller on the rear tooth flank 30*lh* of the trailing tooth 30*l* or on the front tooth flank 30*ev* of the leading tooth 30*e*. The angular distance between the two teeth 30*l* and 30*e* should be correspondingly reduced in comparison to the angular distance between the remaining teeth in the pitch p.

As can be seen particularly from FIGS. 3 and 4, the structure of the shifting chain as alternating inner links 50 and outer links 52 results in a different spatial shifting configuration. In the inner link plate configuration according to FIG. 3 (and FIG. 1), the leading chain link 48*e* in the chain travel direction L that follows the crossing chain link 48 is an inner chain link. The inner link plate 40 located nearer to the sprocket 26 rests with its outer surface 56 against a lateral surface 58 of the leading tooth 30*e* facing the smaller sprocket 24. The leading tooth 30*e* is placed at an incline that corresponds to the course of the shifting chain 16 such that an approximately two-dimensional disposition occurs on the opposite side.

A second tooth 30*z* that follows the leading tooth 30*e* in the direction opposite the chain travel direction L, on the other hand, engages between the outer link plates 38 of the second chain link 48*z*, with this tooth being advanced up to the inner surface 60 of the outer link plate 38 and resting with its front tooth flank, relative to the chain travel direction L, on the outer circumference of the inner link plate 40 of the leading chain link 48 that is above the sprocket 26 in FIG. 3.

FIGS. 3 and 4 show the path of the chain in an imprecise manner because the chain section 16*a* is shown in an elongated fashion. The chain actually has an arced path. At the beginning of the shifting process, the chain is axially displaced by the derailleur 22 (FIG. 10) in the direction of the larger sprocket 26 such that a simple, arced chain line results. Here, the trailing chain link 48*l* opposite the trailing tooth 28*l* is trying to move as far as possible toward the outer sprocket 26, optionally until it is in contact, as shown respectively in FIGS. 3 and 4, with the inner surface 60 or 64 of the lower outer link plates 38 or inner link plates 40 of the trailing chain link 48*l* (implied by a dashed contour line in FIGS. 3 and 4). In contrast to the drawn illustration in FIGS. 3 and 4, the chain path would need to be corrected accordingly (curved in the direction of the arrow A).

Correspondingly, after the chain 16 has been placed on the larger sprocket 26, a curve results in the opposite direction (arrow B) around the first and second teeth 30*e* and 30*z*. Then an elongated S-shaped curve of the chain results, approximately corresponding to a chain curve line 64 indicated in the drawings with a dot-dash line.

In the outer link plate configuration according to FIG. 4 (and FIG. 1), an outer link plate 38 of the leading chain link 48*e* is located with its inner surface 60 on an outer surface 66 of the leading tooth 30*a* facing away from the smaller sprocket 24. This outer surface in turn is placed in an oblique fashion corresponding to the path of the chain and, in addition, inclined radially outwards in the direction of the smaller sprocket 24. In order to prevent the corresponding outer link plate 38 from "riding" during the shifting process, the front corner of the tip of the leading tooth 30*e* facing away from the smaller sprocket 24 is provided with a bevel 68.

Because the outer surface 56 of the inner link plates 40 is generally flush with the inner surface 60 of the outer link plates 38 in the elongated path, the chain section 16*a* is displaced in the outer link plate configuration according to FIG. 4 by the tooth thickness z of the tooth 30*e* in contrast to the inner link plate configuration according to FIG. 3 where it is displaced in the direction of the axes 44 towards the larger sprocket 26.

A similar situation results in the region of the trailing tooth 28*l*. If one assumes here that, in the inner link plate configuration according to FIG. 3, the trailing tooth 28*l* rests against or is located at a very short distance from the inner surface 64 of the inner link plate 40 removed from the larger sprocket 26, then it is possible in the outer link plate configuration according to FIG. 4 for the outer link plate 38 removed from the sprocket 26 along with its inner surface 60 to advance to the trailing tooth 28*l*. This results in a transverse displacement by the inner link plate thickness e1.

When shifting the chain 16 onto the larger sprocket 26, it is therefore possible for chain 16 to be displaced across from the trailing tooth 28*l* by the link plate thickness e1 farther in the direction of the larger sprocket 26 in the case of an outer link plate configuration as compared to an inner link plate configuration. Thus, as the sprockets continue to turn, the leading chain link 48*e* arrives in the desired position across from the tooth 30*e*, having been displaced upwards by the thickness z of the tooth 30*e* in FIGS. 3 and 4. Reliable shifting is thus ensured.

This axial, i.e., lateral, guidance of the shifting chain 16 during the shifting process by the trailing tooth 28*l* is independent of the structure of the shifting chain 16 as long as the chain adheres to ISO dimensions as discussed at the outset. Compatibility with shifting chains from different manufacturers is thus ensured. The engagement of the trailing tooth 28*l* in the trailing chain link plate is largely independent of dirt in the cassette as long as such dirt primarily settles between the sprockets.

During shifting, the radial support of the chain section 16*a* occurs on the side of the smaller sprocket 24 at least at the beginning of the shifting movement by way of the chain roller 42*lv* on the front chain joint of the trailing chain link 48*l* with contact with the rear tooth flank of the tooth 48*l*-1 preceding the trailing tooth 48*l*. At the end of the shifting motion, depending on the tension load of the chain and the elongation of the chain, a more or less pronounced contact occurs between the rear chain roller 42*ah* of the trailing chain link (=front chain roller of the crossing chain link 48*q*) and the rear tooth flank 28*lh* of the trailing tooth 28*l*.

The axial guidance on the larger sprocket 26 occurs due to the contact by the respective link plate 38 or 40 of the crossing chain link 48*q* with a front flank 30*ev* of the leading tooth 30*e* in the region of the tooth tip. In the inner link plate configuration according to FIG. 3, it affects the outer circumferential surface 72 of an outer link plate 28 and, in the outer link plate configuration according to FIG. 4, it affects an outer circumferential surface 74 of an inner link plate 40.

The crossing chain link 48*q* is captured in this manner between the trailing tooth 28*a* of the smaller sprocket 24 and the leading tooth 30*e* of the larger sprocket 26. The chain link 48*q* is therefore axially and radially supported on the leading tooth 30*e*, specifically in a defined spatial position appropriate for each of the two shifting configurations. The shifting chain 16 is therefore laid in a predetermined fashion on the larger sprocket 26 in the course of the continued rotation of the chain. The chain links are reliably engaged by the other teeth 30 of the sprocket 26; "riding" is prevented. This is the case for both shifting configurations.

Figure 5:
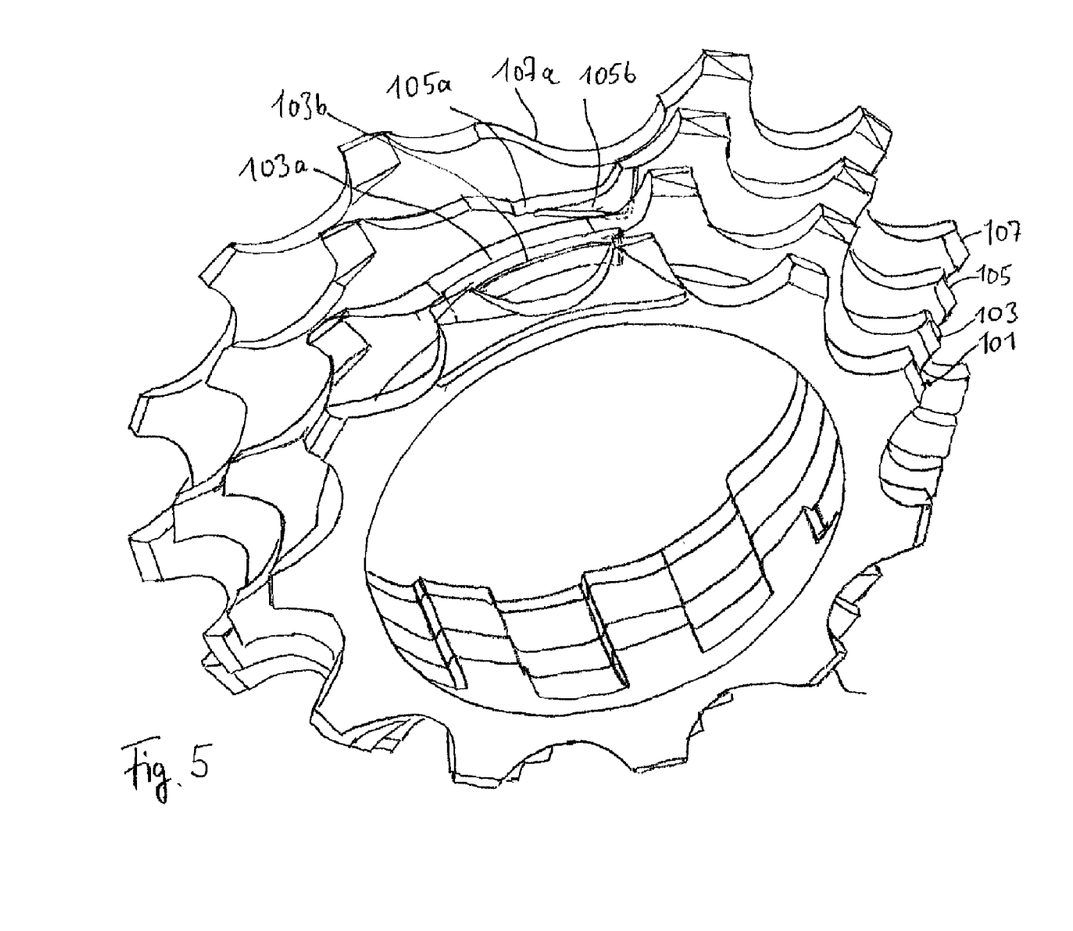
FIG. 5 is a perspective view of an arrangement of four relatively small sprockets, which are in turn part of a multi-speed sprocket assembly, which is otherwise not shown.

FIGS. 5 to 9 show another embodiment of the invention in which components that correspond to those in the first embodiment according to FIGS. 1 to 4 are given the same reference numbers increased by 100. FIG. 5 shows a perspective view of the four smallest sprockets of a ten-speed simple sprocket assembly, in order: a sprocket 101 with a nominal and actual tooth number of 11, a sprocket 103 with a nominal tooth number of 12, a sprocket 105 with a nominal tooth number of 13, and a sprocket 107 with a nominal tooth number of 14. A transitional region 103a, 105a, and 107a has been created for each of the sprockets 103, 105, and 107 by the omission of one tooth.

The transitional region 107a of the sprocket 107 is formed simply by cutting out or stamping out a corresponding region of the sprocket 107 and thus corresponds to the transitional regions 24a and 26a of the sprockets 24 and 26 in the embodiment according to FIGS. 1 to 4.

A region of the sprocket was also cut out or stamped out for the transitional regions 103a and 105a, specifically to the extent that there is at the most a very slight overlap between the crossing chain link 148q and the respective larger sprocket while shifting gears to the larger sprocket. If an overlap occurs, namely during the transition from the sprocket 101 to the sprocket 103, a recess 103b has been pressed out or created by removing material on the side of the larger sprocket 103 facing the smaller sprocket 101; this recess is configured such that, in all shifting situations, there is a clearance between the sprocket 103 and the crossing chain link 148q. The contour line of the recess 103b of the sprocket 103 has been assigned the number 111.

Figure 8:
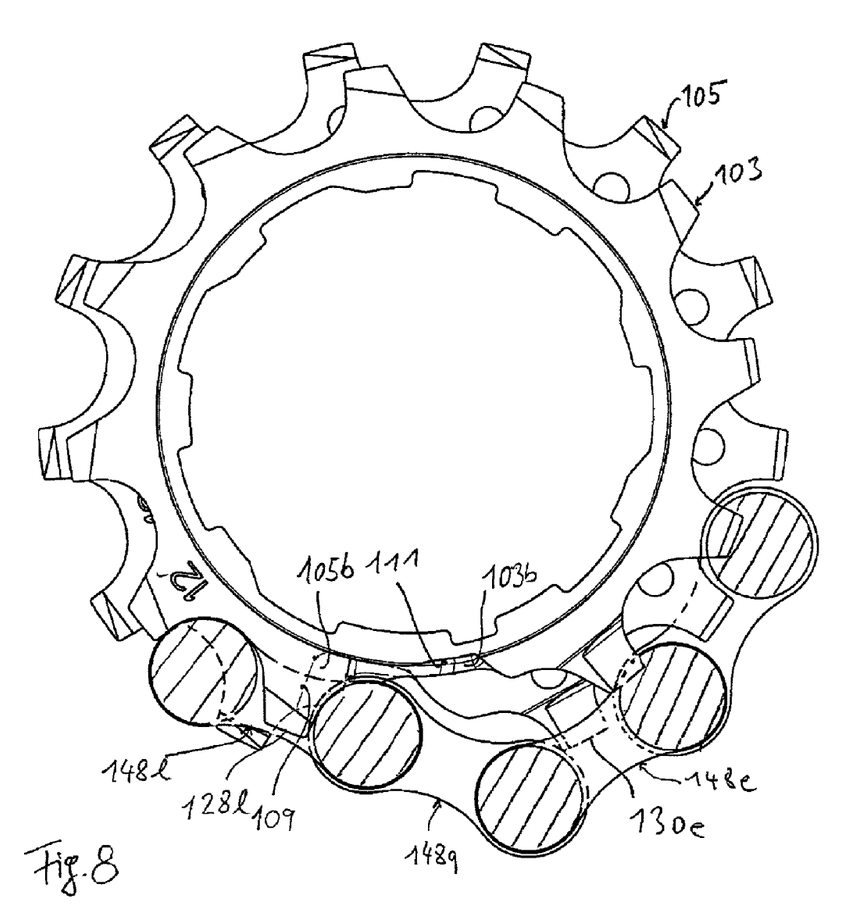
FIG. 8 is a side view of the sprockets with a nominal number of teeth of 12 and a nominal number of teeth of 13 of FIGS. 5 to 7 with a chain section in the upshift transitional area in an inner link plate configuration similar to FIG. 1.
Figure 9:
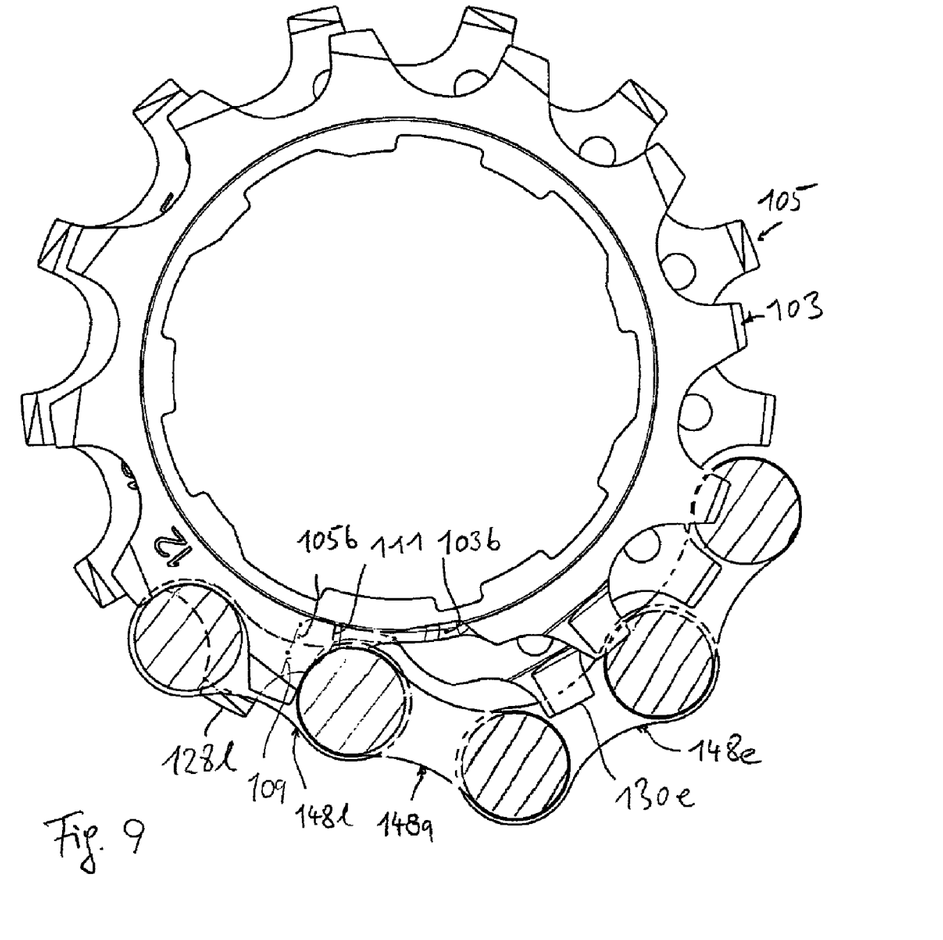
FIG. 9 is a view of the sprockets of FIG. 8, but in an outer link plate configuration similar to FIG. 2.

The sprocket 105 is also provided with a recess 105b; however, this recess is not located across from the crossing chain link 148q but rather across from the trailing chain link 148l when the gear is shifted from the smaller sprocket 103 to the larger sprocket 105. Here as well, the recess 105b is configured such that, in all shifting situations, there is a clearance between the sprocket 105 and the link plates of the trailing chain link 148l. The essentially L-shaped contour of the recess 105b is indicated in FIGS. 8 and 9 with a dot-dash line 109.

Figure 6:
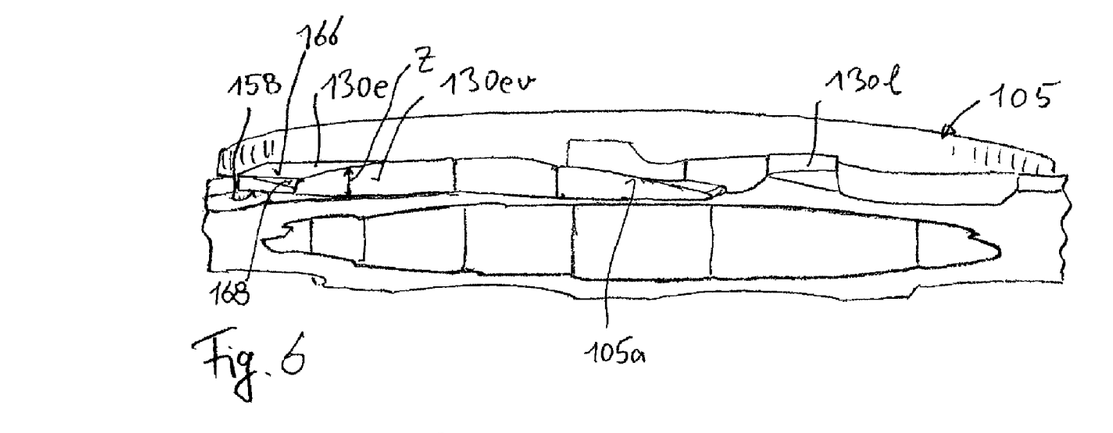
FIG. 6 is a partially sectioned perspective view at an oblique angle from the top of a sprocket of the arrangement of FIG. 5 with a nominal number of teeth of 13.
Figure 7:
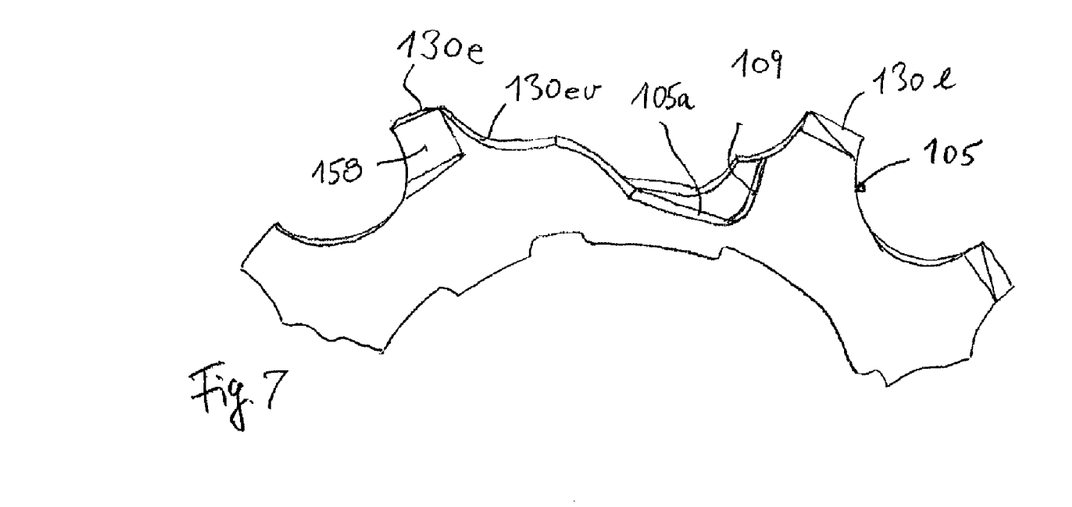
FIG. 7 is a side view with a slight inclination of the sprocket of FIG. 6, also partially sectioned.

The shape of the recess 105b can be seen from FIGS. 6 and 7, as can the shape of the leading tooth 130e. Also discernible are the front tooth flank 130ev, the obliquely placed lateral surface 158, the obliquely placed and inclined lateral surface 166, as well as the bevel 168 on the front corner of the tooth tip of the tooth 130e, where this front corner faces away from the smaller sprocket. The effective tooth thickness z has been drawn in as well. This corresponds to the transverse displacement of the chain 16 in the transition from the outer link plate configuration to the inner link plate configuration and vice versa and, due to the incline of the lateral surface 166, depends on and the insertion depth of the tooth 130e between the outer link plates of the leading chain link 148e. The tooth thickness z is of the same order as the thickness of the chain link plates, i.e., it corresponds to the transverse displacement of the chain relative to the trailing tooth during the (virtual) transition between the outer link plate configuration and the inner link plate configuration and vice versa.

The shifting process corresponds to that of the first exemplary embodiment according to FIGS. 1 to 4 with the same advantages of unlimited compatibility with shifting chains from different manufacturers and greater insensitivity to dirt. This is due to the fact that the recess 105b, which has now been additionally provided, remains out of contact with the link plates of the trailing chain link 148l. The same applies to the recess 113b on the sprocket 103b for the transition from the sprocket 101 to the sprocket 103.

While this invention has been described by reference to one or more preferred embodiments, it should be understood the numerous changes could be made within the spirit and scope of the inventive concepts described. Accordingly, it is intended that the invention not be limited to the disclosed embodiments, but that it have the full scope permitted by the language of the following claims.

What is claimed:

1. A multi-speed sprocket assembly for engaging a shifting chain having chain links that are formed by inner links with inner link plates and outer links with outer link plates and having link connections having chain rollers between the chain links with a distance between the axes of immediately consecutive link connections that establishes a chain pitch, the multi-speed sprocket assembly comprising:
   at least one larger sprocket and at least one smaller sprocket, each having teeth arranged one after the other at a distance corresponding to the chain pitch and single spacewidths formed between consecutive teeth,
   the two sprockets having at least one common upshift transitional region in which, when the chain is displaced from the smaller sprocket to the larger sprocket for the purpose of shifting gears, the chain leaves the smaller sprocket with a trailing tooth of the smaller sprocket being last to engage between the link plates of a trailing chain link of the chain and running onto the larger sprocket, with a leading tooth of the larger sprocket being one of first to engage between the outer link plates of a leading chain link and being located adjacent to the inner link plates of a leading chain link,
   at least the larger sprocket having in its upshift transitional region a double spacewidth created by the omission of a tooth, which is immediately followed by the leading tooth,
   only one chain link crossing from the smaller sprocket to the larger sprocket located between the trailing chain link on the smaller sprocket and the leading chain link on the larger sprocket,
   the chain roller of the link connection between the crossing chain link and the trailing chain link being located directly across from a rear tooth flank of the trailing tooth of the smaller sprocket,
   when the leading chain link is an outer link, the leading tooth then being in contact with the inner surface of an outer link plate of the leading chain link and, with its front tooth flank, cooperating with a circumferential surface of an inner link plate of the crossing chain link,
   when the leading chain link is an inner link, the leading tooth then being in contact with an outer side of an inner link plate of the leading chain link and, with its front tooth flank, cooperating with a circumferential surface of an outer link plate of the crossing chain link,
   the double spacewidth of the larger sprocket configured such that the crossing chain link contacts the larger sprocket only at the leading tooth.

2. The multi-speed sprocket assembly according to claim 1, wherein the larger sprocket has a removed region forming the double spacewidth having a shape such that the larger sprocket, viewed in the axial direction, has essentially no overlap with the crossing chain link.

3. The multi-speed sprocket assembly according to claim 1, wherein the larger sprocket has a removed area forming the double spacewidth with such a shape that the larger sprocket, viewed in the axial direction, has an overlap with the crossing chain link in the form of a recess with a clearance between the recess and the crossing chain link.

4. The multi-speed sprocket assembly according to claim 3 wherein the larger sprocket has a recess in an overlap region with the link plates of the trailing chain link, but with clearance between the recess and the trailing chain link.

5. The multi-speed sprocket assembly according to claim 4, wherein the leading tooth cooperates with the link plate of the crossing chain link in the region of a tooth tip corner formed on the radially outer end of the front tooth flank.

6. The multi-speed sprocket assembly according to claim 5, wherein the leading tooth is provided with a guiding bevel for an outer link plate of the leading chain link in the region of a tooth tip corner formed on the radially outer end of the front tooth flank.

7. The multi-speed sprocket assembly according to claim 6, wherein the leading tooth is placed obliquely to substantially correspond to the path of the crossing chain link and has a thickness that substantially corresponds to the link plate thickness.

8. The multi-speed sprocket assembly according to claim 7, wherein the nominal tooth numbers of the larger sprocket and smaller sprocket have a difference of one.

9. The multi-speed sprocket assembly according to claim 1, wherein the larger sprocket has a recess in an overlap region with the link plates of the trailing chain link, but with clearance between the recess and the trailing chain link.

10. The multi-speed sprocket assembly according to claim 1, wherein the leading tooth cooperates with the link plate of the crossing chain link in the region of a tooth tip corner formed on the radially outer end of the front tooth flank.

11. The multi-speed sprocket assembly according to claim 1, wherein the leading tooth is provided with a guiding bevel for an outer link plate of the leading chain link in the region of a tooth tip corner formed on the radially outer end of the front tooth flank.

12. The multi-speed sprocket assembly according to claim 1, wherein the leading tooth is placed obliquely to substantially correspond to the path of the crossing chain link and has a thickness that substantially corresponds to the link plate thickness.

13. The multi-speed sprocket assembly according to claim 1, wherein the nominal tooth numbers of the larger sprocket and smaller sprocket have a difference of one.

14. A bicycle shifting system comprising:
a driving sprocket assembly;
a driven sprocket assembly;
a shifting chain connecting the driving sprocket assembly and the driven sprocket assembly; and
a derailleur being provided in an uptake region of the chain between the sprockets of the multi-speed sprocket assembly for deflecting and guiding the chain from one sprocket to the other to shift gears,
at least one of the driven and driving sprocket assemblies including:
at least one larger sprocket and at least one smaller sprocket, each having teeth arranged one after the other at a distance corresponding to the chain pitch and single spacewidths formed between consecutive teeth,
the two sprockets having at least one common upshift transitional region in which, when the chain is displaced from the smaller sprocket to the larger sprocket for the purpose of shifting gears, the chain leaves the smaller sprocket with a trailing tooth of the smaller sprocket being last to engage between the link plates of a trailing chain link of the chain and running onto the larger sprocket, with a leading tooth of the larger sprocket being one of first to engage between the outer link plates of a leading chain link and being located adjacent to the inner link plates of a leading chain link,
at least the larger sprocket having in its upshift transitional region a double spacewidth created by the omission of a tooth, which is immediately followed by the leading tooth,
only one chain link crossing from the smaller sprocket to the larger sprocket located between the trailing chain link on the smaller sprocket and the leading chain link on the larger sprocket,
the chain roller of the link connection between the crossing chain link and the trailing chain link being located directly across from a rear tooth flank of the trailing tooth of the smaller sprocket,
when the leading chain link is an outer link, the leading tooth then being in contact with the inner surface of an outer link plate of the leading chain link and, with its front tooth flank, cooperating with a circumferential surface of an inner link plate of the crossing chain link,
when the leading chain link is an inner link, the leading tooth then being in contact with an outer side of an inner link plate of the leading chain link and, with its front tooth flank, cooperating with a circumferential surface of an outer link plate of the crossing chain link,
the double spacewidth of the larger sprocket configured such that the crossing chain link contacts the larger sprocket only at the leading tooth.

* * * * *